United States Patent
Tomkins et al.

(10) Patent No.: US 11,411,894 B2
(45) Date of Patent: Aug. 9, 2022

(54) DETERMINING STRENGTH OF ASSOCIATION BETWEEN USER CONTACTS

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); MyLinh Yang, Saratoga, CA (US); Bo Pang, Sunnyvale, CA (US); Mark Yinan Li, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/394,547

(22) Filed: Dec. 29, 2016

(65) Prior Publication Data

US 2017/0111298 A1    Apr. 20, 2017

Related U.S. Application Data

(63) Continuation of application No. 14/145,130, filed on Dec. 31, 2013, now Pat. No. 9,571,427.

(51) Int. Cl.
*H04L 51/04*    (2022.01)
*H04L 51/00*    (2022.01)
(Continued)

(52) U.S. Cl.
CPC ............. *H04L 51/04* (2013.01); *H04L 51/00* (2013.01); *H04L 51/02* (2013.01); *H04L 51/16* (2013.01);
(Continued)

(58) Field of Classification Search
CPC ...... G06Q 50/01; G06Q 10/107; G06Q 10/10; H04L 51/32; H04L 67/306; H04L 51/16;
(Continued)

(56) References Cited

U.S. PATENT DOCUMENTS 6,115,709 A    9/2000  Gilmour et al.
6,438,543 B1   8/2002  Kazi et al.
(Continued)

FOREIGN PATENT DOCUMENTS

CN    102724140 A    10/2012

OTHER PUBLICATIONS

European Patent Office, Communication—Extended European Search Report of Patent Application No. EP14830470.2, DE; 9 pages; dated Jul. 21, 2017.
(Continued)

*Primary Examiner* — Kevin T Bates
*Assistant Examiner* — Ranjan Pant
(74) *Attorney, Agent, or Firm* — Middleton Reutlinger

(57) ABSTRACT

Methods and apparatus related to identifying one or more messages sent by a user, identifying two or more contacts that are associated with one or more of the messages, determining a strength of relationship score between identified contacts, and utilizing the strength of relationship scores to provide additional information related to the contacts. A strength of relationship score between a contact and one or more other contacts may be determined based on one or more properties of one or more of the messages. In some implementations, contacts groups may be determined based on the strength of relationship scores. In some implementations, contacts groups may be utilized to disambiguate references to contacts in messages. In some implementations, contacts group may be utilized to provide suggestions
(Continued)

to the user of additional contacts of a contacts group that includes the indicated recipient contact of a message.

13 Claims, 8 Drawing Sheets

(51) Int. Cl.
  *H04L 51/52* (2022.01)
  *H04L 51/02* (2022.01)
  *H04L 67/306* (2022.01)
  *H04L 51/48* (2022.01)
  *H04L 12/58* (2006.01)
  *H04L 29/08* (2006.01)
(52) U.S. Cl.
  CPC ............ *H04L 51/32* (2013.01); *H04L 67/306* (2013.01); *H04L 51/28* (2013.01)
(58) Field of Classification Search
  CPC ..... H04L 67/02; H04L 51/28; H04L 61/1594; H04L 63/104; H04L 43/08; H04L 51/36; H04L 51/04; H04L 51/02; H04L 51/00; G06F 17/30867; G06F 17/30864
  See application file for complete search history.

(56) References Cited

U.S. PATENT DOCUMENTS

| | | | |
|---|---|---|---|
| 7,475,010 B2 | 1/2009 | Chao | |
| 7,496,500 B2 | 2/2009 | Reed et al. | |
| 7,672,833 B2 | 3/2010 | Blume et al. | |
| 7,702,631 B1 | 4/2010 | Basu et al. | |
| 7,813,916 B2 | 10/2010 | Bean | |
| 8,046,226 B2 | 10/2011 | Soble et al. | |
| 8,055,707 B2 | 11/2011 | Desai et al. | |
| 8,364,467 B1 | 1/2013 | Bowman et al. | |
| 8,375,099 B2 | 2/2013 | Carroll et al. | |
| 8,457,950 B1 | 6/2013 | Gardner et al. | |
| 8,521,818 B2 | 8/2013 | McGann et al. | |
| 8,527,522 B2 | 9/2013 | Baron et al. | |
| 8,660,602 B2* | 2/2014 | Akhtar | H04L 51/28 455/412.1 |
| 8,738,634 B1* | 5/2014 | Roth | H04L 51/22 707/748 |
| 8,744,976 B2 | 6/2014 | Jagadish et al. | |
| 8,984,074 B2 | 3/2015 | Monaco | |
| 9,297,925 B1* | 3/2016 | Riley | G01W 1/00 |
| 10,346,411 B1* | 7/2019 | Deselaers | G06F 16/24578 |
| 10,769,217 B2* | 9/2020 | Clark | G06F 7/26 |
| 2007/0050455 A1* | 3/2007 | Yach | G06Q 10/109 709/206 |
| 2007/0083552 A1* | 4/2007 | Allen | G06F 17/2705 |
| 2007/0198474 A1* | 8/2007 | Davidson | G06Q 10/107 |
| 2007/0245006 A1* | 10/2007 | Lehikoinen | H04L 51/14 709/223 |
| 2009/0005011 A1* | 1/2009 | Christie | G06Q 10/107 455/412.2 |
| 2009/0100183 A1* | 4/2009 | Lam | G06F 15/16 709/229 |
| 2009/0177981 A1* | 7/2009 | Christie | G06F 3/04883 715/758 |
| 2009/0228583 A1* | 9/2009 | Pocklington | H04L 51/00 709/224 |
| 2009/0271370 A1* | 10/2009 | Jagadish | G06Q 10/10 |
| 2009/0327438 A1* | 12/2009 | Cheng | H04L 51/28 709/206 |
| 2010/0017194 A1* | 1/2010 | Hammer | G06F 17/2785 704/9 |
| 2010/0161369 A1 | 6/2010 | Farrell et al. | |
| 2010/0245262 A1* | 9/2010 | Vance | G06Q 10/107 345/173 |
| 2010/0246789 A1* | 9/2010 | Vance | H04W 4/08 379/201.01 |
| 2010/0250672 A1* | 9/2010 | Vance | G06Q 10/109 709/204 |
| 2010/0287504 A1* | 11/2010 | Vance | G06Q 10/107 715/811 |
| 2011/0055334 A1 | 3/2011 | Tivyan | |
| 2011/0137636 A1 | 6/2011 | Srihari et al. | |
| 2011/0298701 A1* | 12/2011 | Holzer | G06Q 90/00 345/156 |
| 2011/0314017 A1* | 12/2011 | Yariv | G06Q 30/02 707/737 |
| 2012/0005221 A1 | 1/2012 | Ickman et al. | |
| 2012/0030588 A1 | 2/2012 | Sinha | |
| 2012/0124059 A1* | 5/2012 | Pratt | G06Q 10/107 707/748 |
| 2012/0150532 A1 | 6/2012 | Mirowski et al. | |
| 2012/0150978 A1 | 6/2012 | Monaco et al. | |
| 2012/0150979 A1 | 6/2012 | Monaco | |
| 2012/0166999 A1* | 6/2012 | Thatcher | G06Q 10/107 715/780 |
| 2012/0173636 A1* | 7/2012 | O'Sullivan | H04L 12/6418 709/206 |
| 2012/0239761 A1 | 9/2012 | Linner et al. | |
| 2012/0260188 A1* | 10/2012 | Park | H04L 51/32 715/739 |
| 2012/0317499 A1 | 12/2012 | Shen | |
| 2013/0102290 A1* | 4/2013 | Akhtar | G06Q 50/01 455/414.1 |
| 2013/0117393 A1* | 5/2013 | Cohen | G06Q 10/107 709/206 |
| 2013/0073662 A1 | 6/2013 | Meunier et al. | |
| 2013/0290436 A1 | 10/2013 | Martin et al. | |
| 2013/0311589 A1* | 11/2013 | Feng | H04L 51/28 709/206 |
| 2013/0339358 A1 | 12/2013 | Huibers et al. | |
| 2014/0006523 A1* | 1/2014 | Hofman | G06Q 10/10 709/206 |
| 2014/0074953 A1* | 3/2014 | Piazza | H04L 51/28 709/206 |
| 2014/0081914 A1 | 3/2014 | Smith et al. | |
| 2014/0214976 A1* | 7/2014 | Zhou | H04L 51/02 709/206 |
| 2014/0237046 A1* | 8/2014 | Brooks | G06Q 50/01 709/204 |
| 2015/0081803 A1* | 3/2015 | Dick | G06Q 10/107 709/206 |
| 2015/0120829 A1* | 4/2015 | Johnson | H04L 67/22 709/204 |
| 2016/0057101 A1* | 2/2016 | Hugard, IV | H04L 41/12 709/220 |

OTHER PUBLICATIONS

International Search Report and Written Opinion of PCT Serial No. PCT/US14/72655, dated Aug. 12, 2015.
Corston-Oliver, Simon et al., "Task-Focused Summarization of Email," Microsoft Research Jul. 2004, (http://www1.cs.columbia.edu/~lokesh/pdfs/Corston.pdf), 8 pages, USA.
Laclavik, et al., "Email Analysis And Information Extraction For Enterprise Benefit," Institute of Informatics, Slovak Academy of Sciences, Computing and Informatics, vol. 30, 2011, pp. 57-87, Slovakia.
Komen, Erwin R. "Coreference Annotation Guidelines1," Jun. 2009, 13 pages, Netherlands.
The State Intellectual Property Office of the People's Republic of China; Office Action issued in Application No. 201480071661.1 dated Mar. 27, 2018.
The State Intellectual Property Office of the People's Republic of China; Office Action issued in Application No. 201480071661.1 dated Nov. 6, 2018.
China National Intellectual Property Administration; Notice of Grant issued in Application No. 201480071661.1 dated Apr. 3, 2019.

(56) References Cited

OTHER PUBLICATIONS

European Patent Office, Intention to Grant issued in Application No. EP14830470.2, 42 pages; dated Sep. 23, 2019.

* cited by examiner

To: billw@exampleurl.com
Term: "Bob"

Replace with "Bob Jones?"

YES  NO

FIG. 6B

DETERMINING STRENGTH OF ASSOCIATION BETWEEN USER CONTACTS

BACKGROUND

A user may utilize one or more systems to create messages and send the messages to one or more contacts of the user. The user may send messages to multiple contacts and one or more of the contacts may reply to one or more of the contacts and the user.

SUMMARY

This specification is generally directed to methods and apparatus for determining strength of association between user contacts. For example, some implementations are directed to identifying one or more messages that are sent or received by a user and determining a strength of relationship score between a contact and one or more other contacts of the user based on the messages. A contact includes other users that have sent and/or received a message from the user and/or other users whose contact information is accessible to the user. A message may be identified that was sent by the user to multiple contacts of the user and/or received by the user and that was additionally sent to one or more contacts of the user. In some implementations, a strength of relationship score may be determined between a contact and one or more other contacts based on a count of messages that include co-occurrence of the contact and the one or more other contacts. In some implementations, the strength of relationship score may additionally and/or alternatively be determined based on one or more properties of messages in which the contact and the one or more other contacts co-occur.

Strength of relationship scores may be utilized to determine one or more groups of related contacts based on the determined strength of relationship scores. Some implementations of the specification are generally directed to determining one or more properties of a contacts group based on one or more properties of messages in which members of the contacts group co-occur. Some implementations of the specification are directed to utilizing one or more contacts groups to disambiguate a reference to a contact in a future message by determining, based on the recipient and/or sender that are associated with a message, the most likely contact that is being referenced. Other implementations of the specification are directed to providing the user with suggested additional contacts that are members of a contacts group when the user indicates a member of that contacts group as a recipient of a message.

In some implementations, a method is provided that includes the steps of: identifying one or more messages sent or received by a user and sent or received by a plurality of contacts of the user; determining a strength of relationship score between a first contact of the plurality of contacts and a second contact of the plurality of contacts, the strength of relationship score based on occurrence of the first contact and the second contact in one or more of the messages; identifying an indication of the first contact, the indication provided by the user; and providing a property of the second contact to the user, the property provided in response to the indication and provided based on the strength of relationship score.

This method and other implementations of technology disclosed herein may each optionally include one or more of the following features.

The method may further include the step of determining a contacts group, the contacts group including the first contact and the second contact, and the contacts group determined based on the strength of relationship score. The method may further include the steps of: identifying a third contact of the plurality of contacts; determining a new strength of relationship score between the third contact and the contacts group; and associating the third contact with the contacts group if the new strength of relationship score satisfies a threshold. The new strength of relationship score may be based on a count of messages of the one or more messages in which the first contact, the second contact, and the third contact co-occur.

The indication may be a designation of the first contact as recipient of a new message, the property may be contact information for the second contact, and providing the property may include providing a suggestion to the user to designate the second contact as a recipient of the new message. The suggestion may be an autocomplete suggestion.

The method may further include the step of determining a contacts group property, the contacts group property determined based on one or more message properties of one or more of the messages in which the first contact and the second contact co-occur. One or more of the message properties may be a term in one or more of the messages. The contacts group property may be a relationship type, the relationship type indicative of a relationship between the user and the contacts of the contacts group. The one or more of the message properties may be a domain name of an email address of at least one of the contacts of the contacts group. The step of determining the contacts group property may further include the step of determining one or more entities associated with one or more terms in one or more messages.

The strength of relationship score between the first contact and the second contact may be based on a count of messages of the one or more messages in which the first contact and the second contact co-occur.

In some implementations, a method is provided and includes the steps of: identifying one or more messages sent or received by a user and sent or received by a plurality of contacts of the user, each of the messages including one or more properties; determining a strength of relationship score between a first contact and at least one additional contact, the strength of relationship score based a count of the messages in which the first contact co-occurs with the at least one additional contact, and based on at least one of the properties of one or more of the messages in which the first contact co-occurs with the at least one additional contact; determining a contacts group based on one the strength of relationship score; and associating the contacts group with the user.

This method and other implementations of technology disclosed herein may each optionally include one or more of the following features.

The method may further include the step of determining a contacts group property, the contacts group property determined based on one or more of the properties of one or more of the messages in which the first contact and the at least one additional contact co-occur.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine strength of relationship scores between contacts of a user based on one or more messages that are sent and/or received by the user and multiple contacts of the user and associate the strength of relationship scores with the user. The strength of relationship scores may be utilized to determine one or more contacts groups of related contacts and associate the contacts groups with the user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6B illustrates a notification that may be provided to a user to suggest disambiguating a reference to a contact in a message

DETAILED DESCRIPTION

Figure 1:
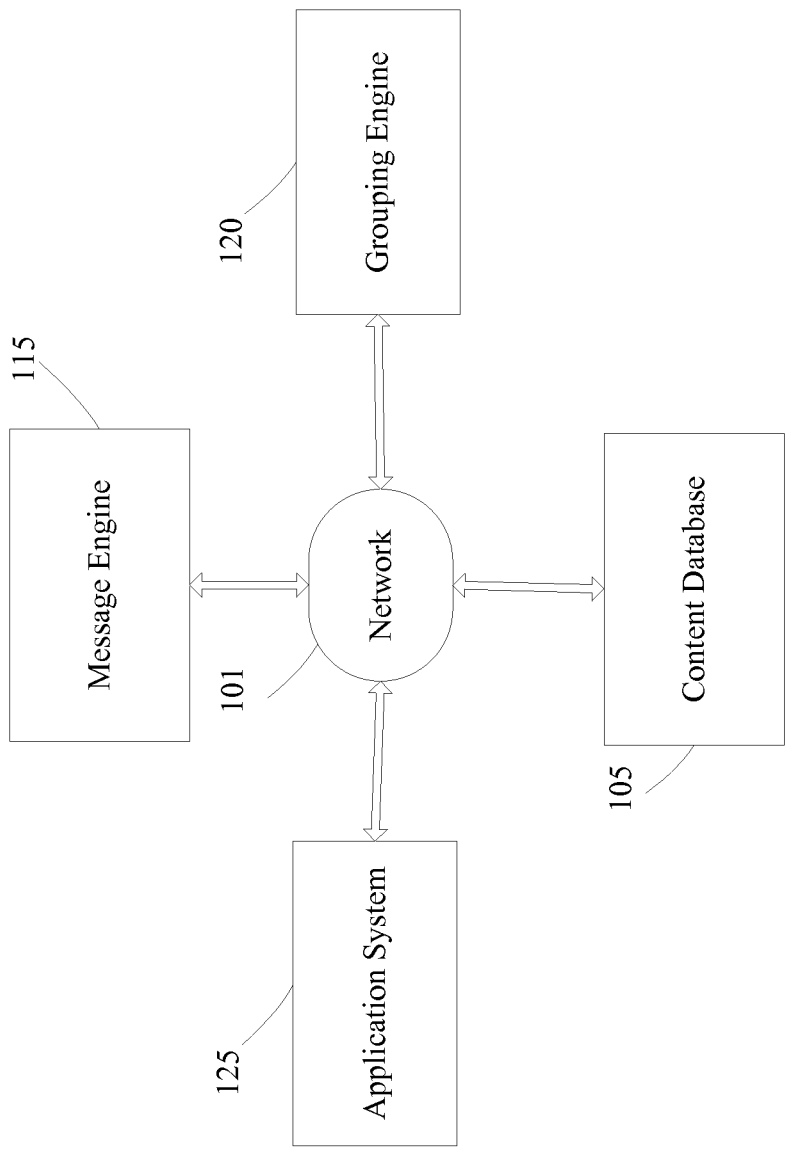
FIG. 1 is a block diagram of an example environment in which a method of determining strength of association between contacts of a user may be implemented.

A user may have one or more contacts that are related based on a relationship between the user and the contacts. For example, a user may have multiple contacts that are coworkers of the user and that are additionally coworkers with each other. In some implementations, one or more of the individuals of a group of contacts may be related to each other and the user by one or more additional relationships. For example, a user may have multiple contacts that have a "coworkers" relationship and that additionally have a "friends" relationship with each other and the user that is separate from the "coworkers" relationship. The "coworkers" group of contacts may include contacts that are not part of the "friends" group, and the "friends" group may include contacts that are not part of the "coworkers" group.

A user may send one or more messages to one or more contacts of a group of contacts, wherein the messages are related to a property of the group of recipient contacts. Contacts groups may be recipients of different types of messages and/or may receive messages regarding different subjects based on the type of contacts group of the contacts. For example, a group of "coworkers" contacts may send and receive messages from the user that are related to work functions, such as business meetings, and a group of "friends" contacts may receive and send messages that are related to social events.

In some implementations, contacts groups may be determined based on past messages that have been sent by the user to multiple contacts and/or that have been received by multiple contacts. Groups of contacts may be determined, for example, based on determining co-occurrence of contacts in messages, lack of co-occurrence of contacts in messages, frequency of messages to one or more contacts, and/or one or more properties of messages directed to and/or received from one or more contacts. In some implementations, one or more properties may be determined for a contacts group based on, for example, one or more properties of messages that are sent to multiple contacts of the contacts group, one or more identified properties of contacts of the contacts group, and/or identified relationships between the user and the contacts of the contacts group.

In some implementations, a user may have interest in sending a message to one or more members of a group and may additionally have interest in sending the message to other members of the group. For example, a user may create a message regarding an upcoming party, indicate one or more members of a "friends" group as recipients of the message, and may additionally have interest in sending the message to other members of the "friends" contacts group but not to a "coworkers" contacts group. The user may be prompted with suggestions of other contacts that are members of the "friends" group as additional recipients based on likelihood that a user may have interest in indicating the additional contacts of the contacts group as recipients of the message.

In some implementations, a user may send and/or receive a message that includes one or more ambiguous references to a contact of the user. For example, a user may send a message that includes the terms "Meet at Bob's house," wherein the message does not specify the "Bob" that is being referenced. The user and/or recipients of the message may be associated with multiple "Bob" contacts. The reference to "Bob" may be disambiguated based on identifying a contacts group that includes the sender and/or recipients of the message and determining whether the contacts group additionally includes a "Bob" contact. The term may be clarified based on determining that the "Bob" contact that is referenced is the "Bob" contact that is a member of the same contacts group as the other recipients of the message since the sender of the message may be more likely mention a "Bob" contact that is a member of the same contacts group as the recipients of the message than mentioning a "Bob" contact of the user that is not a member of the contacts group that includes the message recipients.

Referring to FIG. 1, a block diagram is illustrated of an example environment in which a method of determining strength of association between contacts of a user may be implemented. The example environment includes content database 105, message engine 115, grouping engine 120, and application system 125. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 7:
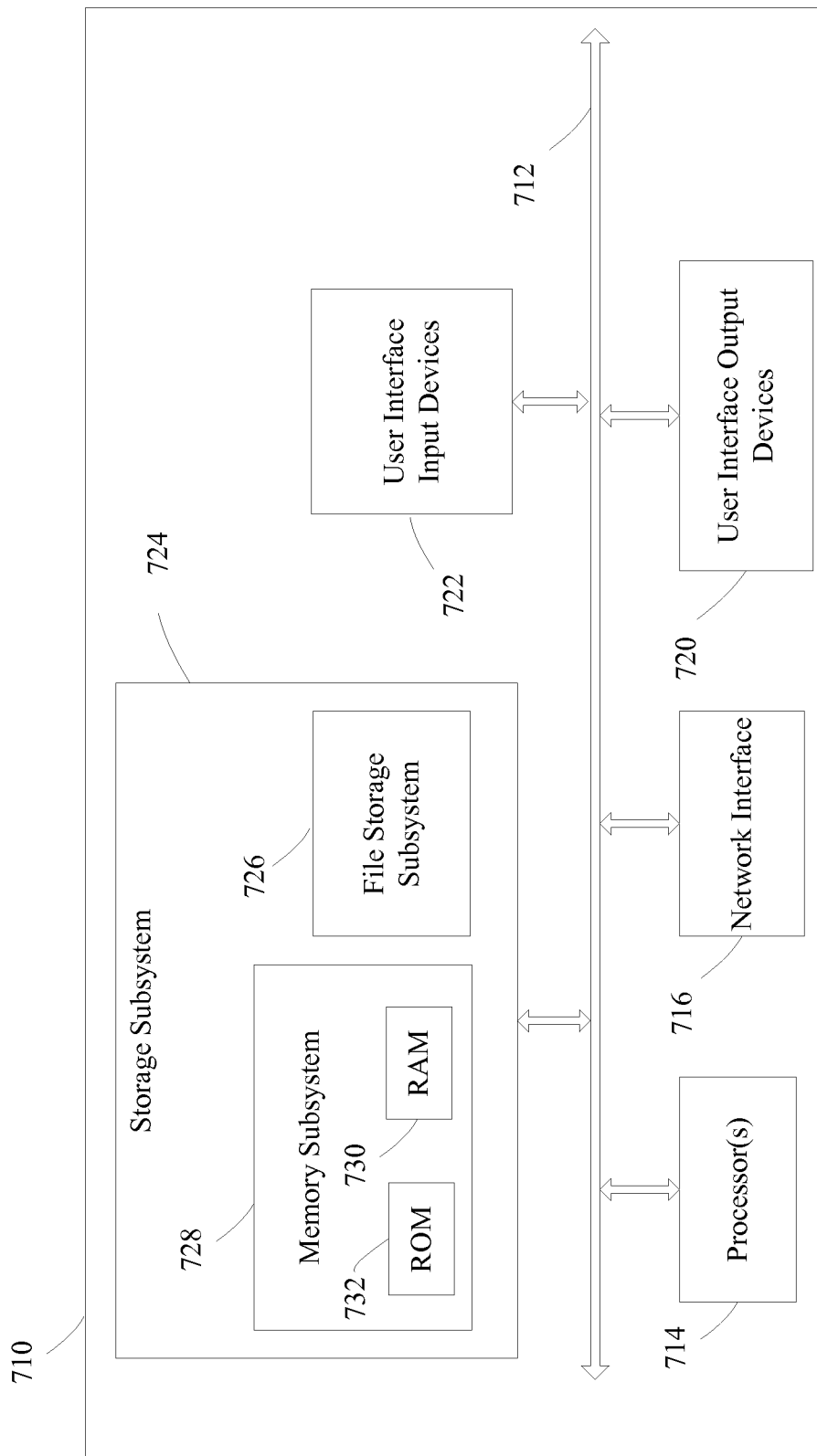
FIG. 7 illustrates a block diagram of an example computer system.

The content database 105, message engine 115, grouping engine 120, application system 125, and/or one or more additional components of the example environment of FIG. 1 may each include memory for storage of data and software applications, a processor for accessing data and executing applications, and components that facilitate communication over a network. In some implementations, content database 105, message engine 115, grouping engine 120, and/or application system 125 may include hardware that shares one or more characteristics with the example computer system that is illustrated in FIG. 7. The operations performed by components of the example environment may be distributed across multiple computer systems. For example, content database 105, message engine 115, grouping engine 120, and/or application system 125 may be computer programs running on one or more computers in one or more locations that are coupled to each other through a network.

The content database 105 may include one or more storage mediums. For example, in some implementations, the content database 105 may include multiple computer servers each containing one or more storage mediums. Information described herein may optionally be stored in the content database 105 and/or an additional database. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, content database 105 may be utilized by one or more components to store and/or access one or more messages. For example, a message may be created by a user and stored in content database 105 for subsequent utilization by one or more components. In some implementations, messages may include archived messages that have been previously sent by the user. In some implementations, content database 105 may include messages that have been composed by the user but not sent. In some implementations, content database 105 may include messages that have been received by the user from one or more contacts of the user.

In some implementations, content database 105 may include contact information for one or more contacts of the user. For example, content database 105 may be a component of an email application and/or a web-based email system and may include information regarding recipients and/or senders of previous emails that are associated with the user. In some implementations, content database 105 may include contact information for contacts that has been directly provided by a user. For example, content database 105 may be utilized by a contacts application that stores email addresses, phone numbers, and/or social media webpage addresses that have been provided by the user for one or more contacts of the user.

In some implementations, content database 105 may include information about groups of contacts of the user. For example, content database 105 may include information about a group of contacts that are associated with a "Family" contacts group and/or one or more of the contacts. Contacts groups may be determined based on one or more techniques described herein. In some implementations, a user may modify and/or create one or more contacts groups. For example, a user may create a "Family" contacts group and indicate one or more contacts to include as members of the group.

In some implementations, content database 105 may be utilized to identify and/or store one or more entities that may be associated with one or more terms in a message. For example, content database 105 may include a mapping (e.g., data defining an association) between entities and one or more attributes and/or other related entities. In some implementations, entities are topics of discourse. In some implementations, entities are persons, places, concepts, and/or things that can be referred to by a textual representation (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more attributes associated with the entity and/or with other entities. For example, in some implementations, the content database 105 may include attributes associated with unique identifiers of one or more entities. For example, a unique identifier for the entity associated with the airport with an airport code "LAX" may be associated with a name or alias attribute of "LAX," another alias attribute of "Los Angeles International Airport" (an alternative name by which LAX is often referenced), a phone number attribute, an address attribute, and/or an entity type attribute of "airport" in the entity database. Additional and/or alternative attributes may be associated with an entity in one or more databases.

Message engine 115 may identify one or more messages of a user. A message is a communication between two or more contacts. A message includes one or more terms and an indication of a sender and one or more recipient parties. In some implementations, a message may be a message trail of one or more related messages. For example, a message may be a message trail that includes an original message sent from User 1 to User 2 and a reply to the message sent from User 2 to User 1. In some implementations, a message may include multiple recipients. For example, User 1 may create a message and provide the message to both User 2 and User 3. In some implementations, a user may designate a group of contacts as recipients of a message. For example, a user may be associated with a "Family" group of contacts and the user may indicate the "Family" group as recipients of a message. Messages may include, for example, emails, text messages, social media postings, instant messages, and/or message board postings. In some implementations, one or more contacts may be associated with an alias that is different from the contact information of the contact. For example, a contact may have contact information that includes an email address of "bob@exampleurl.com" and additionally the contact may be associated with an alias of "Bob Smith." As described herein, a contact of a user may be referenced by an alias and/or a message contact identifier, such as an email address.

In some implementations, message engine 115 may identify one or more messages when a user creates the message. For example, message engine 115 may be a component of an email application and/or a web-based email system and identify messages associated with the user that are sent and/or received via the application and/or system. In some implementations, message engine 115 may identify a message of a user when the user begins to compose the message and/or identify one or more recipients of an email. In some implementations, message engine 115 may identify one or more messages that are received by the user from a contact of the user. For example, message engine 115 may identify a message that is received by the user via an email application and/or system. In some implementations, message engine 115 may identify one or more messages from content database 105. For example, message engine 115 may identify an archived message of a user via content database 105 that was sent and/or received by the user.

Figure 3:
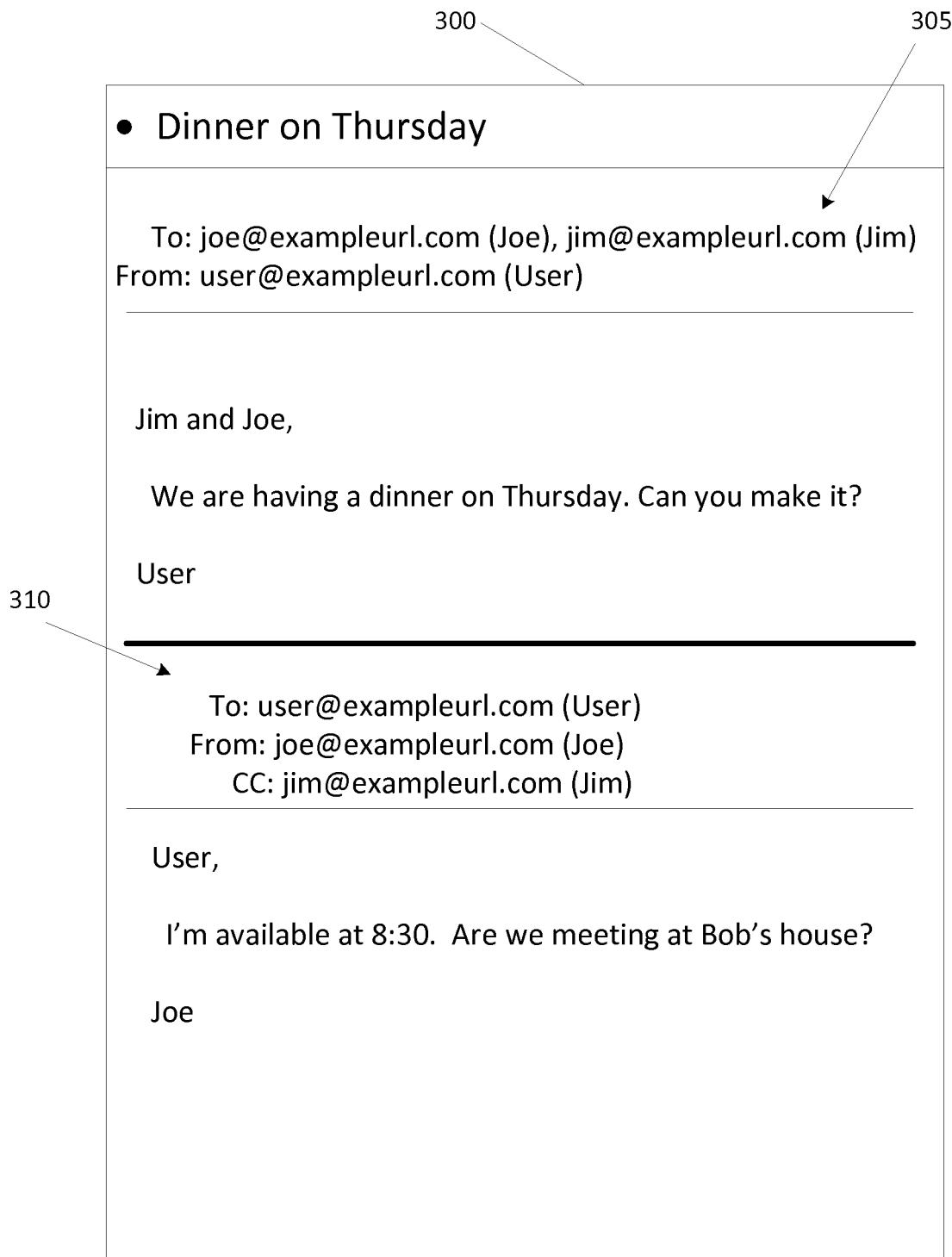
FIG. 3 is an example of a message.

Referring to FIG. 3, an example message 300 is provided. In the illustrated message 300, an initial message 305 and a reply message 310 is provided as a message trail of related messages. The initial message 305 includes a sender "user@exampleurl.com" and recipients "joe@exampleurl.com" and "jim@exampleurl.com," with aliases of "Joe" and "Jim." One or more of the recipients may be provided by the creator of the message and/or populated by one or more methods as described herein. The reply message 310 indicates that the reply message 310 was sent by "Joe" to "Jim" and "User" in response to the initial message 305. Message engine 115 may identify the message 300, one or more aliases of contacts, and/or contact information for the sender and/or receiver of the message from content database 105.

Message engine 115 may identify one or more messages that include references to contacts of the user. In some implementations, message engine 115 may identify messages based on the messages having similar senders and/or recipients (contacts that are indicated on a message as "To:," "From:," "CC:," etc.). For example, message engine 115 may identify a message from "jim@exampleurl.com" that was sent to "joe@exampleurl.com" and "bob@exampleurl.com" and additionally identify a message from "joe@exampleurl.com" that was sent to "jim@exampleurl.com" and "bob@exampleurl.com." In some implementations, message engine 115 may identify one or more references to contacts in the body of one or more messages. For example, message engine 115 may identify a message that was sent by "Bob" to "Jim" and that includes a reference to "Joe" in the body of the message.

Message engine 115 may provide grouping engine 120 with one or more identified messages. In some implementations, grouping engine 120 may be a component of an application that is executing on a computing device of a user. For example, grouping engine 120 may be a component of an email application of the user. In some implementations, grouping engine 120 may be an application and/or a component of an application that is executing remotely from a computing device of a user. For example, grouping engine 120 may be a component of a web-based email application and/or a separate application that is executing on a remote server and in communication with a local computing device of the user and/or with one or more additional or alternate servers.

Grouping engine 120 may utilize one or more messages provided by message engine 115 to determine strength of relationship between user contacts that are associated with the user. In some implementations, a strength of relationship score may be determined between one or more contacts of the user. For example, message engine 115 may provide a message that is between the user, "Bob," and "Jim," and grouping engine 120 may determine a strength of relationship score between the contacts "Bob" and "Jim." In some implementations, grouping engine 120 may determine a strength of relationship score between the user and one or more contacts that are associated with one or more messages. For example, with respect to the previous example, grouping engine 120 may determine strength of relationship scores for relationships between the user and "Bob" and/or between the user and "Jim" based on one or more messages that are sent and/or received by the user.

Grouping engine 120 may utilize multiple messages to determine strength of relationship scores between contacts of a user and/or between the user and contacts of the user. For example, message engine 115 may identify two or more messages that are associated with a user and that are associated with same contacts and provide grouping engine 120 with the messages, references to the messages, and/or one or more properties of the messages. Also, for example, message engine may provide grouping engine 120 with multiple messages that are associated with the user and that are associated with one or more of the same contacts in addition to one or more contacts that are not common to all identified messages.

Grouping engine 120 may identify one or more terms in a message of a user and utilize one or more of the identified terms to determine strength of relationship scores and/or to determine one or more properties to assign to a contacts group. In some implementations, determining terms to utilize may include identifying one or more terms in messages based on term frequency and/or inverse document frequency. For example, a term that occurs multiple times and/or in multiple messages may be utilized if the frequency of occurrences of the term satisfies a threshold. Also, for example, a term that occurs less frequently than other common terms may be indicative of a term that, when used, is of importance in messages that include the term. In some implementations, determining terms to utilize may be based on identifying one or more terms from content database 105 that are determined to be likely terms to utilize. For example, grouping engine 120 may identify "golf" from content database 105 as a term that may indicate that contacts in messages that include "golf" are likely associated.

In some implementations, determining terms to utilize may additionally or alternatively be based on positioning of one or more terms in messages. For example, terms that are included earlier in a message may be more likely to be utilized than terms that are included later in messages. Also, for example, terms in headings of messages may be more likely to be utilized than terms that occur in the body of text of a message.

Grouping engine 120 may utilize multiple messages to determine one or more strength of relationship scores for a contact. In some implementations, grouping engine 120 may determine a strength of relationship score between two contacts. For example, one or more messages may include "Joe" and "Bob" and a strength of relationship may be determined between "Joe" and "Bob." In some implementations, grouping engine 120 may determine a strength of relationship score between a contact and a contacts group that includes one or more contacts. For example, a contacts group may be determined based on occurrence of members of the contacts group in one or more messages and/or properties of messages in which members of the contacts group occur.

In some implementations, grouping engine 120 may determine a strength of relationship score between a contact and a second contact or contacts group based on a count of messages that includes an indication of the contact and an indication of the second contact or members of the contacts group. For example, group engine 120 may determine a strength of relationship score between two contacts based on the count of messages that include the two contacts. Also, for example, group engine 120 may determine a strength of relationship score between a contact and a contacts group based on the count of messages that include the contact and additionally include one or more of the members of the contacts group.

In some implementations, grouping engine 120 may determine a strength of relationship score between a contact and a second contact or contacts group based on a count of messages where the contact and the second contact or contacts group do not co-occur. For example, grouping engine 120 may determine a strength of relationship score between two contacts based on the frequency of co-occurrences of the two contacts in messages wherein at least one of the contacts occurs. For example, a contact that occurs in 50 messages and co-occurs with a second contact in 25 of those messages may have a determined strength of relationship score that is more indicative of a relationship than a contact that occurs in 50 messages and that co-occurs in 10 of those messages with the second contact.

In some implementations, grouping engine 120 may determine a strength of relationship score between a contact and a second contact or contacts group based on occurrence of one or more properties in messages where the contact and the second contact or contacts group co-occur. A property may include, for example, one or more terms in the body of messages, domain names associated with email address of one or more contacts in messages, and/or metadata associated with messages. Properties of interest may be identified based on one or more techniques such as those described herein.

In some implementations, grouping engine 120 may determine a strength of relationship score based on occurrence of a property in multiple messages that include a contact and a second contact or contacts group. For example, grouping engine 120 may identify occurrences of "Restaurant 1" in multiple messages that include a first contact and a second contact, and determine a strength of relationship score between the contacts based on a count messages between the contacts where "Restaurant 1" occurs and/or frequency of messages between the contacts in which "Restaurant 1" occurs.

In some implementations, grouping engine 120 may identify properties in one or more messages that are associated with related entities and determine a strength of relationship score based on an identified relationship between the entities. For example, grouping engine 120 may identify "work," "office," and "meeting" in messages that include a contact and a second contact or contacts group and identify a "co-workers" entity that is associated with "work," "office, " and "meeting" entities. Grouping engine 120 may determine a strength of relationship score between the contact and the second contact or contacts group based on, for example, frequency of occurrences of entities associated with a "co-workers" entity in messages that include the contacts, frequency of messages between the contact and a second contact or contacts group that include references to entities associated with the "co-workers" entity, and/or frequency of messages that include references to entities associated with the "co-workers" entity that include the contact and the second contact or contacts group.

Figure 4:
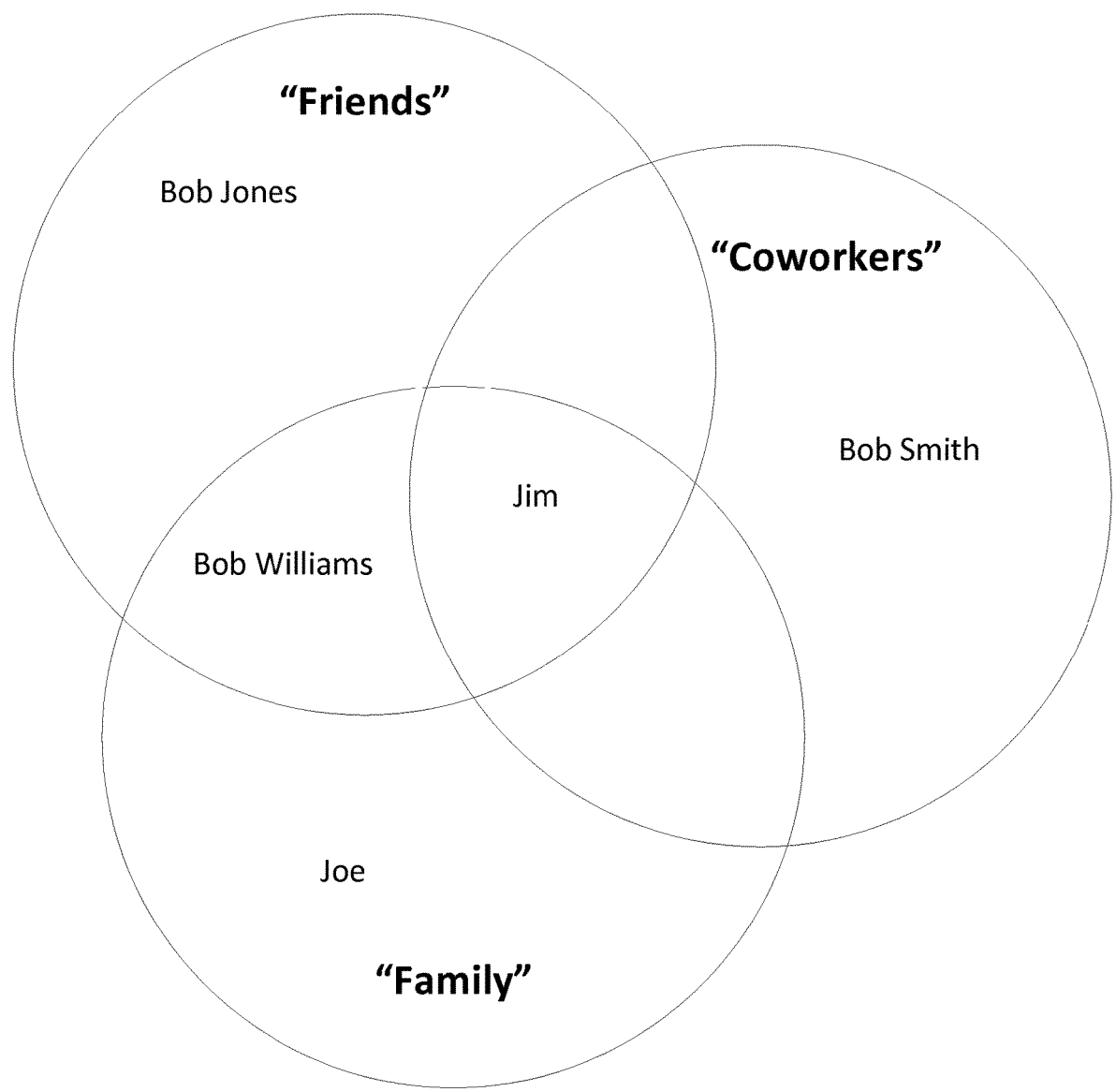
FIG. 4 is a Venn diagram of example contacts and contacts groups.

Referring to FIG. 4, a Venn diagram of example contacts and contacts groups is provided. In the illustrated diagram, circles represent contacts groups that are associated with the user and the names ("Bob Smith," "Jim," etc.) represent contacts of the user. The contacts groups include a relationship type in bold and quoted that describes the determined connection between the members of the group and the user as described herein. Names that are included in multiple circles, such as "Jim," which is in the "Friends," "Coworkers," and "Family" contacts groups, represent contacts that are included in multiple contacts groups. Names that appear in the same circle are members of the contacts group that is represented by that circle. For example, "Bob Smith" and "Jim" are both members of a "Coworkers" contacts group. Names that do not appear in a circle are not members of the contacts group represented by the circle. For example, "Joe" is a member of the "Family" group but not the "Friends" group or the "Coworkers" group.

The groups of FIG. 4 may be determined based on strength of relationship scores between the contacts of the user. Grouping engine 120 may determine the "Friends" group based on one or more determined strength of relationship scores between "Bob Jones," "Bob Williams," and "Jim." Also, for example, grouping engine 120 may determine that the strength of relationship score between "Bob Jones" and "Joe" is not indicative of a relationship between those contacts, but that the strength of relationship score "Joe," "Jim," and "Bob Williams" is indicative of a relationship.

In some implementations, grouping engine 120 may determine a property of a contacts group. A contacts group property is one or more attributes that are common and/or similar between the contacts of the contacts group and/or that is indicative of a common relationship between members of the contacts group and the user. In some implementations, a contacts group property may be a type of relationship that is in common with the members of the contacts group. For example, a property may be a relationship type of "Coworkers" for a contacts group that includes one or more coworkers of the user. Referring to FIG. 4, the relationship types for the illustrated contacts groups are provided in bold and quoted. For example, "Joe," "Bob Williams," and "Jim" are included in a contacts group with a relationship type property of "Family." Other properties of a contacts group may include, for example, a preference of members of a group (e.g., "Friends that like Restaurant 1"), a common location of the members of a group ("Family that lives nearby"), and/or a group with common interests (e.g., "Friends I go golfing with," "Friends I go out to eat with").

In some implementations, grouping engine 120 may determine the relationship type based on one or more properties that are identified in messages that include the members of the group. For example, grouping engine 120 may identify one or more terms that are included in one or more messages that are sent and/or received by members of a group and identify one or more entities in content database 105 that are aliases of entities that are indicative of relationships. For example, multiple messages between contacts in a contacts group and the user may include the terms "mom" and "dad," and grouping engine 120 may identify entities with the aliases "mom" and "dad" that are associated with a "family relationships" entity. Grouping engine 120 may associate "Family" with the contacts group based on determining that the contacts of the contacts group are likely family based on determining that the contacts have mentioned family relationships in one or more messages. Also, for example, multiple messages between contacts in a contacts group and the user may include the terms "Restaurant 1" and "Restaurant 2," and grouping engine 120 may identify entities with the aliases "Restaurant 1" and "Restaurant 2" that are associated with a "restaurants" entity. Grouping engine 120 may determine a "Friends I eat with" property for the contacts group based on determining that a threshold of messages that includes the members of the contacts group includes references to restaurants.

Application system 125 may utilize one or more contacts groups that are determined by grouping engine 120. In some implementations, application system 125 may be a messaging system and/or a component of a messaging system. For example, application system 125 may be an email application, a web-based email system, and/or a component of an email system or application. In some implementations, application system 125 may be a component and/or a system that is associated with message engine 115 and/or grouping engine 120.

In some implementations, application system 125 may utilize one or more groups of associated contacts to suggest one or more contacts to a user when a user creates a message. For example, a user may create a message and indicate a recipient of the message that is a member of a determined group. Application system 125 may provide the user with one or more additional contacts of the contacts group based on identifying that the intended recipient of the message is a member of a contacts group and that the user may have interest in sending the message to one or more of the additional members of the contacts group. In some implementations, application system 125 may provide one or more groups to the user as a suggested contacts group. The suggested contacts group may be indication by a determined property of the group. For example, a user may create a message and indicate "bob@exampleurl.com" as an intended recipient of the message, and application system 125 may suggest to the user to send the message to one or more contacts that are in a common contacts group with "bob@exampleurl.com."

In some implementations, an indicated recipient of a message may be a member of multiple contacts groups. For example, a contact may be a member of a "Friends" group and a "Coworkers" group. In some implementations, application engine 125 may suggest multiple contacts groups that include the indicated recipient to the user. For example, application engine 125 may suggest that the user select a "Friends" group and/or a "Coworkers" group as recipients of the message. In some implementations, application engine 125 may suggest one or more groups that are more strongly associated by a relationship. For example, an indicated contact of a message may be more strongly associated with members of one contacts group over another contacts group based on strength of association scores with members of the first contacts group that are more indicative of a strong relationship than the strength of association scores between the recipient and the members of the second group. In some implementations, a user may indicate multiple contacts as recipients of a message and application system 125 may suggest one or more contacts groups that include the multiple indicated recipients as members. In some implementations, application system 125 may suggest a contacts group that includes a contact that is a member of multiple contacts groups based on identifying one or more terms that is more indicative of one contacts group than other contacts groups. For example, a message recipient may be a member of a "family" contacts group and a "coworkers" contacts group" and application system 125 may be more likely to provide the "family" contacts group in messages that include the term "mom" based on identifying that an entity associated with "mom" is associated with a "family" entity.

Figure 5A:
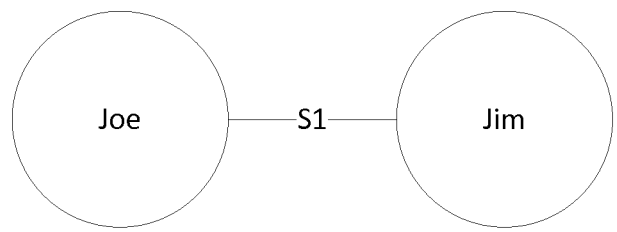
FIG. 5A, FIG. 5B, and FIG. 5C are diagrams illustrating examples of contacts and determined contacts groups.
Figure 5B:
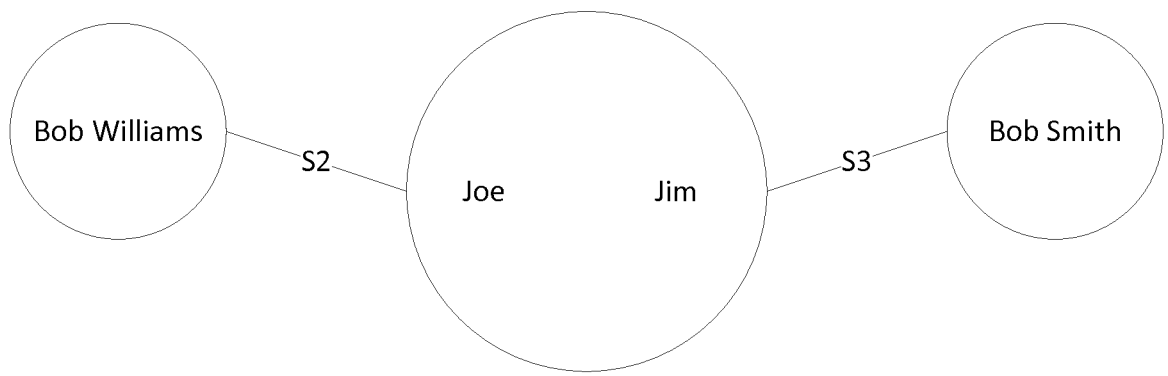
Figure 5C:
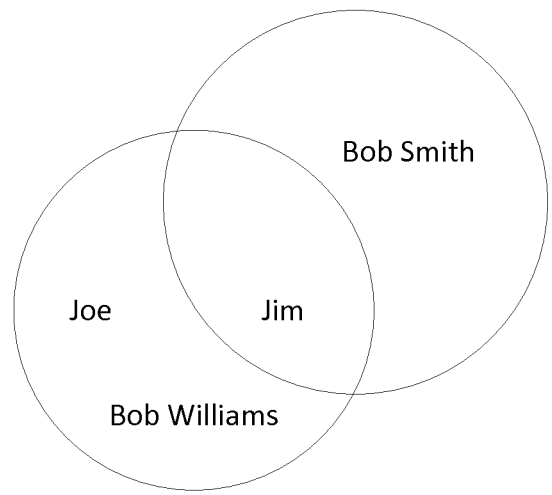

Referring to FIG. 5A through FIG. 5C, diagrams illustrating examples of contacts and determined contacts groups of the contacts are provided. The contacts and contacts groups are represented by circles that include the name of the contact ("Bob Williams," "Bob Smith," etc.) or the names of members of a contacts group (e.g., "Joe" and "Jim" in FIG. 5B). The lines connecting the circles represent strength of relationship scores (S1, S2, etc.) that may be determined by group engine 120. In the provided examples, the contacts are assumed to be the same throughout the examples. For example, the "Joe" in FIG. 5A is the same contact as the "Joe" in FIGS. 5B and 5C.

Referring to FIG. 5A, two contacts are illustrated with a strength of relationship score S1. The strength of relationship score may be determined based on one or more techniques as described herein. Message engine 115 may identify multiple messages in which "Joe" and "Jim" co-occur and group engine 120 may determine S1 based on the messages. For example, group engine 120 may determine strength of relationship score S1 based on, for example, the frequency of co-occurrence of "Joe" and "Jim" in messages that include "Joe" and/or "Jim." Also, for example, group engine 120 may determine strength of relationship score S1 based on determining the count of messages in which "Restaurant 1" is included in messages in which "Joe" and "Jim" co-occur. Also, for example, group engine 120 may determine a strength of relationship score S1 based on determining the co-occurrence of "Joe" and "Jim" in messages that have been sent and/or received by "Joe" and "Jim" within a time period, such as messages that have been sent and/or received in the last 30 days. A contacts group may be determined that includes "Joe" and "Jim" based on the strength of relationship score S1 satisfying a threshold. For example, group engine 120 may determine a contacts group that includes "Joe" and "Jim" if at least 50% of messages associated with the user and that include a reference to "Joe" or "Jim" include both "Joe" and "Jim."

Referring to FIG. 5B, a contacts group is illustrated that includes "Joe" and "Jim" and two additional contacts of the user, "Bob Williams" and "Bob Smith." "Joe" and "Jim" may be included in the contacts group based on the strength of relationship S1 satisfying a threshold. Strength of relationship score S2 is a strength of relationship score between "Bob Williams" and the contacts group. In some implementations, S2 may be determined based on determining, for example, the occurrence of "Bob Williams" in messages that include members of the contacts group. In some implementations, S2 may be determined based on frequency of occurrences of "Bob Williams" in all messages that are associated with the user in which members of the contacts group occurs. Additionally, S3 is a strength of relationship score between the contacts group and "Bob Smith."

Referring to FIG. 5C, contacts groups that include multiple overlapping contacts are provided. In the illustrated example, "Joe," "Jim," and "Bob Williams" are included in the same contacts group based on S2 satisfying a threshold. Additionally, "Bob Smith" is not included in the same contacts group based on S3 not satisfying a threshold. "Jim" and "Bob Smith" are illustrated in a second contacts group based on, for example, a strength of relationship score between "Jim" and "Bob Smith" satisfying a threshold. "Jim" is included in both contacts groups based on multiple strength of relationship scores that include "Jim" satisfying a threshold.

Figure 6A:
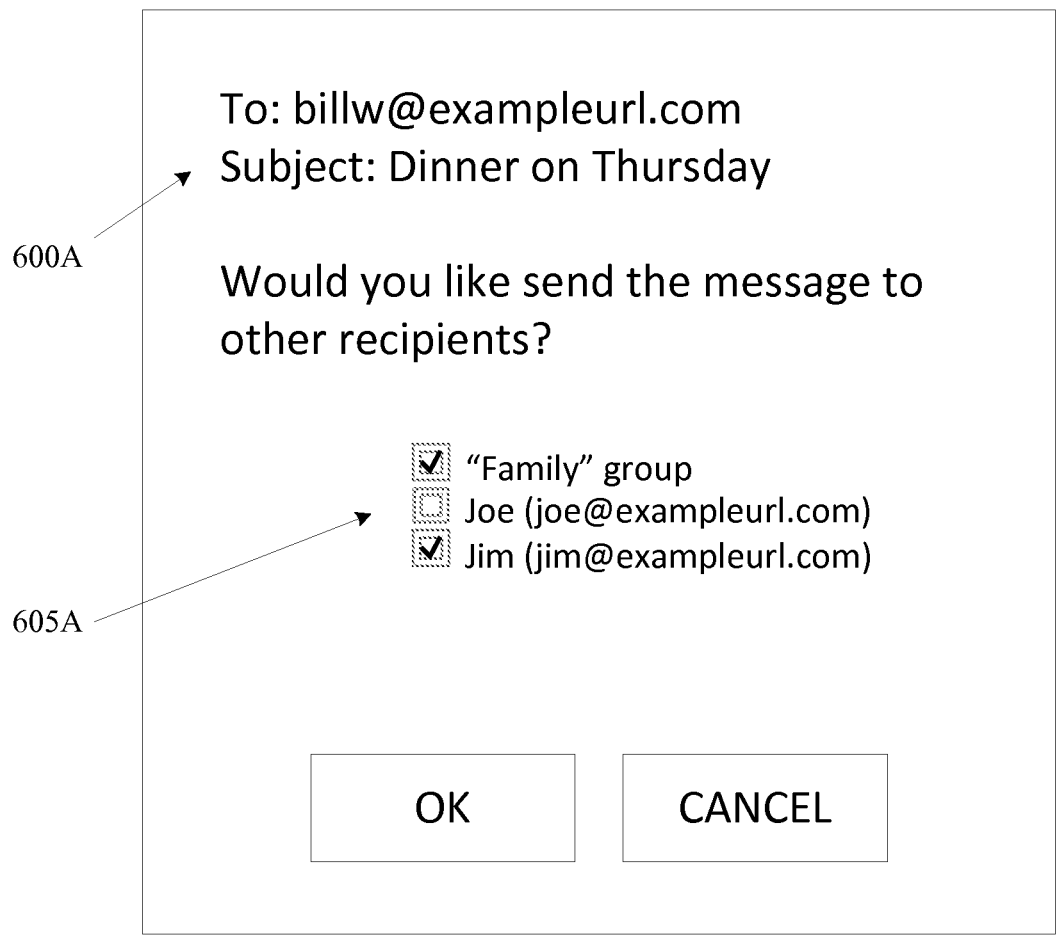
FIG. 6A illustrates an example notification that may be provided to a user before the user sends a message to one or more contacts.

Referring to FIG. 6A, an example notification is illustrated that may be provided to a user before the user sends a message to one or more contacts. The notification may be provided to the user as an additional interface while the user is creating a message. For example, the user may be creating the message that is illustrated in FIG. 3 and the notification may be provided to the user when the user enters "billw@exampleurl.com" as the recipient of the message. In the illustrated notification, the user is provided message information 600A that indicates information associated with a message, such as a recipient "Bill Williams" and a subject of the message "Dinner on Thursday." Additionally, the illustrated notification includes group options 605A. In some implementations, group options 605A may include one or more contacts that are in a common contacts group with the recipient that has been indicated as a recipient of the message. For example, in the illustrated notification, the group options 605A includes "Joe" and "Jim," which may be contacts that grouping engine 120 has determined are related to "billw@exampleurl.com." Because the contacts are identified as members of a common contacts group, application system 125 may provide the user with options to include one or more of the additional contacts as recipients of the message based on likelihood that the user may have interest in sending the message to additional members of the group that includes the indicated recipient "Bill Williams." The user may select one or more checkboxes that are included with the potential additional recipients to include the additional contacts.

Additionally, the group options 605A includes the contacts group "Family" as an option for the user to indicate a group of contacts as recipients of the message. "Family" may be a contacts group that includes the original recipient of the message, "Bill Williams," and one or more additional contacts. In some implementations, the additional contacts that are provided in group options 605A may be members of the contacts group "Family."

In some implementations, application system 125 may utilize one or more groups to disambiguate a reference to one or more contacts in a message of a user that is ambiguous. For example, a user may create a message that includes a name of a contact and the user may be associated with multiple contacts that may be indicated by the name. For example, Referring to FIG. 3, initial message 305 includes an ambiguous reference to "Bob." The user and/or the recipients may be associated with multiple "Bob" contacts and grouping application 125 may identify one more contacts groups that are associated with the user and include a "Bob" contact. Referring to FIG. 4, the user is associated with a "Bob Jones" contact and a "Bob Williams" contact. Application engine 125 may identify the other recipients of the message as member of a contacts group "Family" and identify that one of the possible disambiguated contacts, "Bob Williams," is a member of the same contacts group and the other possible disambiguated contact, "Bob Jones," is a member of a "Friends" group with "Jim," but is not a member of the contacts group that includes all indicated recipients of the message. Application system 125 may provide the user with a notification that the term "Bob" is ambiguous and to suggest a replacement term, such as "Bob Williams."

Referring to FIG. 6B, a notification is illustrated that may be provided to a user to suggest disambiguating a reference to a contact in a message. In the illustrated notification, the user is provided the reference that has been identified as ambiguous, "Bob." The user is prompted to determine whether the reference is to "Bob Jones" and whether the user would like to replace the ambiguous reference with "Bob Jones." In some implementations, the ambiguous reference may be automatically changed while the user is creating the message. For example, the user may indicate "Bob" in a message the application system 125 may highlight "Bob" and/or change "Bob" to "Bob Jones."

Additionally or alternatively, a recipient of a message may be provided with a notification and/or option to disambiguate one or more terms in a received message based on contact information that is associated with the recipient. For example, a recipient may receive a message that includes a reference to "Bob" and application system 125 may automatically disambiguate the reference to "Bob Jones" and/or prompt the recipient that the reference is potentially to "Bob Jones" based on "Bob Jones" being a member of the same contacts group as the recipient and/or one or more other recipients of the message.

In situations in which the systems described herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

Figure 2:
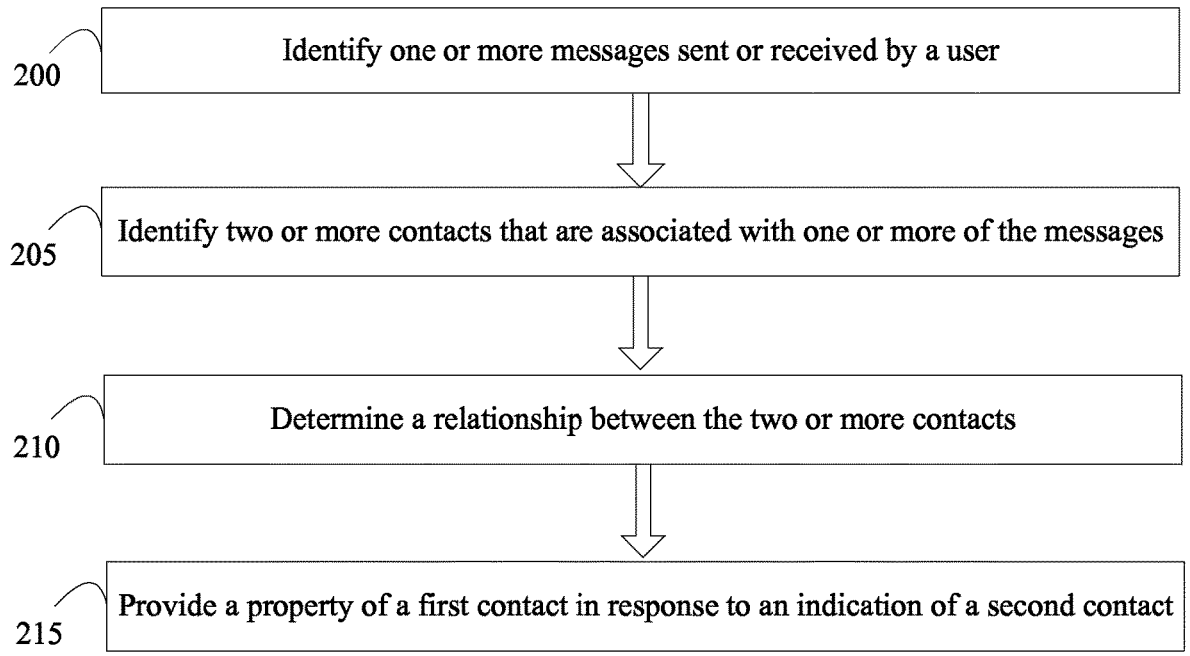
FIG. 2 is a flow chart of an example method to determine strength of relationships between two or more contacts of a user.

Referring to FIG. 2, a flow chart is illustrated of an example method to determine strength of relationship between two or more contacts of a user. Other implementations, may perform the steps in a different order, omit certain steps, and/or perform different and/or additional steps that those illustrated in FIG. 2. For convenience, aspects of FIG. 2 will be described with reference to one or more components of FIG. 1 that may perform the method such as the message engine 115, the grouping engine 120, and/or the application system 125.

At step 200, one or more messages sent or received by a user are identified. In some implementations, the identified messages may be identified by a component that shares one or more characteristics with message engine 115. In some implementations, the messages may be messages that have been created by the user but have not been sent. For example, a user may create a message, store the message in content database 105, and subsequently send the message. A message may include one or more properties, such as sender contact information, contact information for one or more identified recipients, one or more terms, and/or metadata associated with one or more components of the message.

At step 205, two or more contacts that are associated with one or more of the messages are identified. In some implementations, the contacts may be identified via one or more properties of the message, such as the sender and/or the receiver of one or more of the messages. In some implementations, one or more of the identified contacts may be identified based on one or more properties of the message, such as one or more terms in the message body and/or header. A contact includes other users that have sent and/or received a message from the user and/or other users whose contact information is accessible to the user regardless of whether the user has sent or received a message from that user.

At step 210, a relationship is determined between the two or more identified contacts. In some implementations, message engine 115 may provide grouping engine 120 with the identified messages and grouping engine 120 may determine a strength of relationship score between two or more contacts. In some implementations, grouping engine 120 may determine a strength of relationship between two contacts. In some implementations, grouping engine 120 may determine a strength of relationship score between a contact and a contacts group that includes two or more contacts. Grouping engine 120 may determine strength of relationship scores based on one or more techniques as described herein, such as co-occurrence of contacts in messages, one or more properties of messages, and/or frequency of occurrence of contacts in messages.

In some implementations, determining a relationship between contacts may include determining a contacts group that includes two or more of the contacts based on the strength of relationship scores between the contacts. For example, a strength of relationship score between two contacts may be indicative of a relationship between the contacts and a contacts group may be determined based on the relationship. Also, for example, a strength of relationship score between a contact and a contacts group may be determined that is indicative of a relationship between the contact and the members of the contacts group and the contact may be included in the contacts group based on the determined strength of relationship score between the contact and the contacts group.

In some implementations, determining a relationship between contacts may include determining a property of a contacts group that includes one or more contacts. Properties of contacts groups may be determined based on one or more techniques described herein, such as identifying one or more properties of messages in which the members of a contacts group co-occur. For example, message engine 115 may identify one or more messages that include the contacts of a contacts group and grouping engine 120 may identify "Restaurant 1" and "Restaurant 2" in the messages. Grouping engine 120 may determine a contacts group property of "Friends I have dinner with" based on determining that messages that include the members of the contacts group include names of restaurants. In some implementations, grouping engine 120 may identify one or more entities in content database 105 that are associated with properties of messages and identify associations between the entities to determine one or more properties of a contacts group.

At step 215, a property of one or more contacts is provided to the user in response to an indication of one or more other contacts. Examples of properties include contact information for one or more contacts, names or nicknames of one or more contacts, and/or contacts group information for one or more contacts. For example, the user may indicate a contact in a message and application system 125 may identify a contacts group that includes the indicated contact and provide the user with contact information for one or more other contacts of the contacts group. In some implementations, the user is associated with the relationships that were determined at step 210 and step 215 may be omitted.

In some implementations, the indication may be a user identifying a contact as a recipient of a message and the user may be provided with one or more suggestions of other contacts to indicate as recipients of the message. The suggestion may be provided to the user based on determining that the relationship between the first contact and the second contact or contacts group is indicative of likelihood that a user may have interest in sending to both the contact and the second contact or contacts group. In some implementations, a message may be created by the user that includes an ambiguous reference to one or more contacts of the user and application system 125 may provide a suggested disambiguation of the reference based on determining a contacts group that includes one or more contacts that are associated with the message and providing one or more properties of a contact that is a member of the identified contacts group.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to identify one or more messages of a user, determine a strength of relationship between one or more contacts that are associated with the message, and associate the relationship with the user. These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, email, social actions or activities, browsing history, a user's preferences), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    determining, for a user, multiple contacts as members of a contacts group, the multiple contacts being determined as members of the contacts group based on a frequency of co-occurrence in a plurality of past messages sent or received by the user; and
    subsequent to determining the multiple contacts as members of the contacts group based on the frequency of co-occurrence in the plurality of past messages sent or received by the user:
        identifying one or more messages that involve the user and at least two of the multiple contacts previously determined to be members of the contact group, and determining a property to assign to the contacts group, wherein determining the property is performed responsive to determining the multiple contacts are members of the contacts group, and
        wherein the property is determined based on content of the identified one or more messages that involve the user and at least two of the multiple contacts previously determined to be members of the contacts group; and
    subsequent to assigning the property to the contacts group and during creation of a new message by the user via a computing device of the user:
        determining that new message content included by the user in a subject or body of the new message corresponds to the property assigned to the contacts group;
        identifying that recipients in a To field of the new message include only a subset of the members of the contacts group;
        based on both (1) determining that the new message content corresponds to the property assigned to the contacts group and (2) identifying that the recipients designated in the To field of the new message include only the subset of the members of the contacts group:
            providing, for presentation to the user via the computing device, an interface:
                that individually identifies one or more of the multiple contacts, that are members of the same contacts group as, but that are not included in the subset of, the members of the contacts group that are already designated as recipients in the To field of the new message, and
                that is selectable via the computing device, wherein selection of the interface via the computing device includes one or more of the identified multiple contacts, that are members of the same contacts group as the recipients already designated in the To field of the new message, as additional recipients of the new message.

2. The method of claim 1, wherein the one or more of the multiple contacts identified in the interface exclude those included in the subset.

3. The method of claim 1, further comprising:
    including the one or more of the identified multiple contacts as the additional recipients of the new message in response to a selection of the interface.

4. The method of claim 1, wherein the new message content includes one or more terms in the body of the new message.

5. The method of claim 1, wherein the content based on which the property for the contacts group is determined includes one or more terms that occur in the identified one or more messages.

6. The method of claim 5, wherein the content is utilized in determining the property for the contacts group based on its occurrence in the subject or the body of the identified one or more messages.

7. A system, comprising:
    memory storing instructions;
    one or more processors to execute the instructions stored in the memory, wherein in executing the instructions one or more of the processors are to:
        determine, for a user, multiple contacts as members of a contacts group, the multiple contacts being determined as members of the contacts group based on a frequency of co-occurrence in a plurality of past messages sent or received by the user; and
        subsequent to determining the multiple contacts as members of the contacts group based on the frequency of co-occurrence in the plurality of past messages sent or received by the user:
  identify one or more messages that involve the user and at least two of the multiple contacts previously determined to be members of the contact group, and
  determine a property to assign to the contacts group,
    wherein determining the property is performed responsive to determining the multiple contacts are members of the contacts group, and
    wherein the property is determined based on content of the identified one or more messages that involve the user and at least two of the multiple contacts previously determined to be members of the contacts group; and
subsequent to assigning the property to the contacts group and during creation of a new message by the user via a computing device of the user:
  determine that new message content included by the user in a subject or body of the new message corresponds to the property assigned to the contacts group;
  identify that recipients in a To field of the new message include only a subset of the members of the contacts group;
  based on both (1) determining that the new message content corresponds to the property assigned to the contacts group and (2) identifying that the recipients designated in a To field of the new message include only the subset of the members of the contacts group:
    provide, for presentation to the user via the computing device, an interface:
      that individually identifies one or more of the multiple contacts, that are members of the same contacts group as, but that are not included in the subset of, the members of the group that are already designated as recipients in the To field of the new message, and
      that is selectable via the computing device, wherein selection of the interface via the computing device includes one or more of the identified multiple contacts, that are members of the same contacts group, as additional recipients of the new message.

8. The system of claim 7, wherein the one or more of the multiple contacts identified in the interface exclude those included in the subset.

9. The system of claim 7, wherein in executing the instructions one or more of the processors are further to:
  include the one or more of the identified multiple contacts as the additional recipients of the new message in response to a selection of the interface.

10. The system of claim 7, wherein the new message content includes one or more terms in the body of the new message.

11. The system of claim 7, wherein the content based on which the property for the contacts group is determined includes one or more terms that occur in the identified one or more messages.

12. The system of claim 11, wherein in determining the property for the contacts group, one or more of the processors are to utilize the content in determining the property based on the content occurring in the subject or the body of the identified one or more messages.

13. At least one non-transitory computer readable storage medium storing instructions that, when executed by at least one processor, cause the at least one processor to perform a method comprising:
  determining, for a user, multiple contacts as members of a contacts group, the multiple contacts being determined as members of the contacts group based on a frequency of co-occurrence in a plurality of past messages sent or received by the user; and
  subsequent to determining the multiple contacts as members of the contacts group based on the frequency of co-occurrence in the plurality of past messages sent or received by the user:
    identifying one or more messages that involve the user and at least two of the multiple contacts previously determined to be members of the contact group, and
    determining a property to assign to the contacts group,
      wherein determining the property is performed responsive to determining the multiple contacts are members of the contacts group, and
      wherein the property is determined based on content of the identified one or more messages that involve the user and at least two of the multiple contacts previously determined to be members of the contacts group; and
  subsequent to assigning the property to the contacts group and during creation of a new message by the user via a computing device of the user:
    determining that new message content included by the user in a subject or body of the new message corresponds to the property for the contacts group;
    identifying that recipients in a To field of the new message include only a subset of the members of the contacts group;
    based on both (1) determining that the new message content corresponds to the property assigned to the contacts group and (2) identifying that the recipients designated in a To field of the new message include only the subset of the members of the contacts group:
      providing, for presentation to the user via the computing device, an interface:
        that individually identifies one or more of the multiple contacts, that are members of the same contacts group as, but that are not included in the subset of, the members of the contacts group that are already designated as recipients in the To field of the new message, and
        that is selectable via the computing device, wherein selection of the interface via the computing device includes one or more of the identified multiple contacts, that are members of the same contacts group as the recipients already designated in the To field of the new message, as additional recipients of the new message.

* * * * *